US012021860B2

(12) United States Patent
Gillis et al.

(10) Patent No.: US 12,021,860 B2
(45) Date of Patent: Jun. 25, 2024

(54) SYSTEMS AND METHODS FOR MULTI-STAGE, IDENTITY-BASED, DIGITAL AUTHENTICATION

(71) Applicant: Bank of America Corporation, Charlotte, NC (US)

(72) Inventors: Trish Gillis, Chicago, IL (US); Taylor Farris, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 295 days.

(21) Appl. No.: 17/750,540

(22) Filed: May 23, 2022

(65) Prior Publication Data
US 2023/0379321 A1 Nov. 23, 2023

(51) Int. Cl.
*G06F 15/16* (2006.01)
*G06F 9/54* (2006.01)
*G06F 21/44* (2013.01)
*H04L 9/40* (2022.01)
*H04L 29/06* (2006.01)
*H04W 12/30* (2021.01)

(52) U.S. Cl.
CPC .......... *H04L 63/0838* (2013.01); *G06F 21/44* (2013.01); *H04W 12/35* (2021.01); *H04L 2463/082* (2013.01)

(58) Field of Classification Search
CPC ........... H04L 63/0838; H04L 2463/082; G06F 21/44; H04W 12/35
USPC .......................................................... 726/7
See application file for complete search history.

(56) References Cited

U.S. PATENT DOCUMENTS 9,330,280 B2 * 5/2016 Rachalwar ............ H04L 63/102
10,496,810 B2 * 12/2019 Lewis ..................... G06F 21/40
(Continued)

*Primary Examiner* — Hamza N Algibhah
(74) *Attorney, Agent, or Firm* — Weiss & Arons LLP

(57) ABSTRACT

Systems and methods for multi-stage, identity-based, digital authentication are provided. Methods include a first and a second stage of authentication. The first stage may include a user profile submitting a first request to access a first digital application; the computing device receiving, as input, one or more authenticating factors; the computing device transmitting, to a central server, the one or more authenticating factors; the central server processing and authenticating the user profile to the first digital application. The second stage of authentication may include: the user profile submitting a second request to access the second digital application that utilizes a separate authentication from the first application; in response to the second request, the first digital application: determining authentication parameters needed to satisfy authentication for the second digital application; determining a gap between the authentication parameters needed to satisfy authentication for the second digital application and information about the user profile stored in the database at the central server; and generating and transmitting an actionable request to the user profile for information that fills the gap; and based on information about the user profile stored in the database at the central server combined with a response received for the actionable request, the first digital application communicating to the second digital application the authentication parameters to achieve authentication of the user profile for the second digital application.

20 Claims, 16 Drawing Sheets

(56) References Cited

U.S. PATENT DOCUMENTS

| | | | |
|---|---|---|---|
| 10,681,547 B1* | 6/2020 | Yang | H04L 63/0263 |
| 11,818,122 B2* | 11/2023 | Goodsitt | H04L 9/0643 |
| 11,954,684 B1* | 4/2024 | Adam | G06Q 20/3265 |
| 2014/0281495 A1* | 9/2014 | Um | G06F 21/44 |
| | | | 713/155 |
| 2015/0150111 A1* | 5/2015 | Friedmann | H04L 63/0815 |
| | | | 726/9 |
| 2015/0312256 A1* | 10/2015 | Seibert, Jr. | H04L 63/102 |
| | | | 726/8 |
| 2019/0294400 A1* | 9/2019 | Lee | G06F 21/83 |
| 2019/0306156 A1* | 10/2019 | Agarwal | H04L 9/088 |
| 2019/0325449 A1* | 10/2019 | Krishnamurthy | G06Q 20/02 |
| 2020/0068399 A1* | 2/2020 | Brown | H04L 9/3236 |
| 2020/0177563 A1* | 6/2020 | Huapaya | H04L 63/0435 |
| 2020/0244644 A1* | 7/2020 | Lewis | H04L 63/083 |
| 2020/0252498 A1* | 8/2020 | Iyer | G05B 15/02 |
| 2020/0259814 A1* | 8/2020 | Fu | H04L 63/0815 |
| 2020/0403986 A1* | 12/2020 | Gosalia | G06F 9/54 |
| 2021/0281567 A1* | 9/2021 | Arai | H04L 63/0876 |
| 2021/0326465 A1* | 10/2021 | Tan | G06F 21/604 |
| 2021/0406038 A1* | 12/2021 | Fetzer | G06F 21/64 |
| 2022/0046023 A1* | 2/2022 | Friend | H04L 63/107 |
| 2023/0122238 A1* | 4/2023 | Huang | H04W 12/06 |
| | | | 726/4 |

* cited by examiner

SYSTEMS AND METHODS FOR MULTI-STAGE, IDENTITY-BASED, DIGITAL AUTHENTICATION

FIELD OF TECHNOLOGY

Aspects of the disclosure relate to digital systems. Specifically, aspects of the disclosure relate to user profile authentication within digital systems.

BACKGROUND OF THE DISCLOSURE

Many computer applications, or other suitable digital platforms, involve high security operations. In order to access high security computer applications, a user may be required to authenticate themselves prior to accessing the high security computer application.

Once a user has gained access to a high security computer application, the user may be able to retrieve confidential, private, or other valuable data. Additionally, once a user has gained access to the high security application, the user may be able to perform high security transactions, such as financial transactions. Such financial transactions may include wire transfers, automated clearing house ("ACH") transactions, electronic check issuance and other such transactions. As such, entry into these high security applications may involve enterprise level security in order to ensure that application access is limited to authentic users.

Conventionally, authentication for a secure computer application may be achieved via a password. Passwords, however, may be associated with security deficiencies. Password deficiencies may include a vulnerability to certain software or bots that may be able to ascertain the password without permission. Passwords may also be associated with inefficiencies and inconveniences. For example, many users have accounts and profiles with tens or even hundreds of applications. It may be inconvenient, difficult, and inefficient to securely maintain different passwords for all the applications. Conversely, it may be insecure to use the same password for all the applications.

It would be desirable, therefore, to provide systems and methods for secure and convenient authentication to computer applications and other platforms. It would be further desirable for the authentication to be achieved without requiring passwords for each computer application or other platform.

SUMMARY OF THE DISCLOSURE

Aspects of the disclosure relate to systems and methods for multi-stage, identity-based, digital authentication. Systems and methods may include a first and a second stage of authentication. Systems may include a computing device. The computing device may include a first digital application and a second digital application. The first and second digital applications may utilize separate authentications. Systems may also include a secure central server.

The first stage of authentication may include a user profile submitting a first request, on the computing device, to access the first digital application. The first stage of authentication may include the computing device receiving, as input, one or more authenticating factors. The first stage of authentication may include the computing device transmitting, to the central server, the one or more authenticating factors.

The first stage of authentication may include the central server processing the one or more authenticating factors. The processing may include comparing the one or more authenticating factors to a database of user profile data to achieve authentication of the user profile's identity when a threshold match is achieved between the one or more authenticating factors and a profile in the database. In response to achieving authentication, the first stage of authentication may include the central server communicating to the computing device that the user profile is authenticated to access the first digital application.

The second stage of authentication may include the user profile submitting a second request, on the computing device, to access the second digital application. The second stage of authentication may include, in response to the second request, the first digital application determining authentication parameters needed to satisfy authentication for the second digital application, determining a gap between the authentication parameters needed to satisfy authentication for the second digital application and information about the user profile stored in the database at the central server, and generating and transmitting an actionable request to the user profile for information that fills the gap.

Based on information about the user profile stored in the database at the central server combined with a response received for the actionable request, the second stage of authentication may include the first digital application communicating to the second digital application the authentication parameters to achieve authentication of the user profile for the second digital application.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 8 shows another illustrative screenshot in accordance with principles of the disclosure;

FIG. 10 shows an illustrative screenshot in accordance with principles of the disclosure;

DETAILED DESCRIPTION OF THE DISCLOSURE

Figure 1:
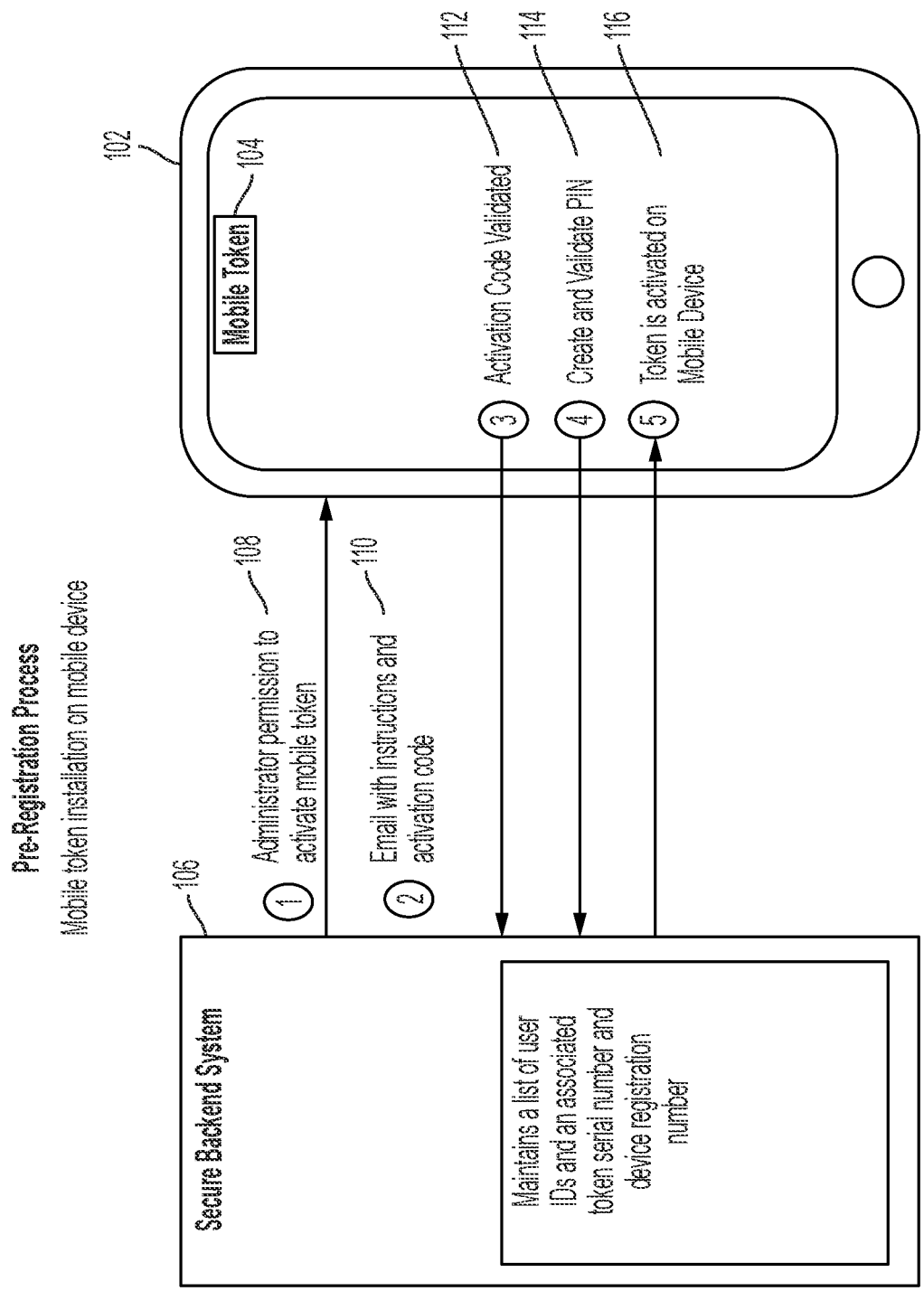
FIG. 1 shows an illustrative diagram in accordance with principles of the disclosure.

Aspects of the disclosure relate to systems and methods for multi-stage, identity-based, digital authentication. An identity-based digital authentication may include authentication that is based on a real identity of a user profile. Real identity may include personal information such as name, birthday, social security number, accounts at a financial institution, etc. Identity-based authentication may be advantageous over conventional authentications which may include shallow authentications that merely rely on limited mechanisms such as a password linked to an account, which may not prove that the user profile attempting to log in is in fact the user they profess to be.

Systems may include a computing device. The computing device may, in some embodiments, be a mobile device such as a mobile phone or tablet. The computing device may also be a laptop, desktop, a wearable or other internet-of-things (IoT) device, or any other suitable computing device. The computing device may include a first digital application and a second digital application. The first and second digital applications may utilize separate authentications. Systems may also include a secure central server. The central server may include a processor and a memory. The central server may be wholly or partially cloud based.

Systems and methods may include a first and a second stage of authentication. The first stage of authentication may include a user profile submitting a first request, on the computing device, to access the first digital application. The first stage of authentication may include the computing device receiving, as input, one or more authenticating factors. The authenticating factors may, for example, include, individually or in combination, a name, username, password, identification number (e.g., account number or PIN), personal information (e.g., birthday), biometric information, and login from a trusted device.

The first stage of authentication may include the computing device transmitting, to the central server, the one or more authenticating factors. The first stage of authentication may include the central server processing the one or more authenticating factors. The processing may include comparing the one or more authenticating factors to a database of user profile data to achieve authentication of the user profile's identity when a threshold match is achieved between the one or more authenticating factors and a profile in the database. In response to achieving authentication, the first stage of authentication may include the central server communicating to the computing device that the user profile is authenticated to access the first digital application.

The second stage of authentication may include the user profile submitting a second request, on the computing device, to access the second digital application. The second stage of authentication may include, in response to the second request, the first digital application determining authentication parameters needed to satisfy authentication for the second digital application. The first digital application may make the determination based on a communication with the second digital application via an application programming interface ("API") of the second digital application. The authentication parameters needed by the second digital application may include, for example, personal information, a password, biometric information, or other suitable authentication parameters.

The first digital application may determine whether the authentication parameters needed to satisfy authentication for the second digital application are satisfied with information already existent in the system (e.g., stored at the central server or on the computing device), or if a gap exists between the authentication parameters and information already existent in the system. When the first digital application determines that a gap exists, the first digital application may generate and transmit an actionable request to the user profile for information that fills the gap. The user profile responding to the actionable request on the computing device may provide the missing information needed to satisfy the authentication parameters.

Based on information about the user profile stored in the database at the central server (and/or stored at the computing device) combined with a response received for the actionable request, the second stage of authentication may include the first digital application communicating to the second digital application the authentication parameters to achieve authentication of the user profile for the second digital application.

Using the first digital application, to which the user profile has already achieved identity-based authentication, to satisfy the authentication parameters of the second application may facilitate a user to leverage authentication to the first digital application to seamlessly gain secure authentication to any number of second applications (without the need to remember a unique password for each of the many second applications), thereby increasing efficiency and convenience while not sacrificing on the security and integrity of the system.

In some embodiments, in response to achieving authentication for the first digital application, the central server may generate a digital authentication token that is stored at the computing device and facilitates access to the first digital application. In certain embodiments, the digital token may also used to facilitate access to the second application.

In some embodiments, one of the authenticating parameters may be a one-time password ("OTP"). The OTP may be generated at the central server for the user profile. The OTP may be stored in the database in connection with the user profile. The OTP may be securely communicated to the user profile. Authentication may be achieved when the OTP that is inputted at the computing device matches the OTP that is stored in the database in connection with the user profile.

In certain embodiments, the OTP may be securely communicated to the user profile via a link in an email message or a push notification to the computing device. In certain embodiments, the OTP may be inputted at the computing device automatically in response to selection of the link.

Certain embodiments may include the first digital application custom tailoring the actionable request based on the authentication parameters needed to satisfy authentication for the second digital application as determined at runtime.

The first digital application may, in some embodiments, communicate the authentication parameters to the second digital application directly via an application programming interface ("API") of the second digital application.

In some embodiments, one of the authenticating factors may include biometric data. The biometric data may be generated by the computing device via one or more sensors of the computing device.

In certain embodiments, the first digital application may be a mobile banking application. In some embodiments, the second stage of authentication may be achieved even when second digital application is a payment platform or a virtual-reality environment. Moreover, the system may be configured to achieve authentication for any suitable second application that the user profile may request access to, even when the system encounters the second application for the first time at runtime.

In certain embodiments, the first and/or second stage of authentication may include some or all of the processes and architectures detailed below.

In some embodiments, a mobile device may be used as a computer authenticator. The system may include a computing apparatus. The computing apparatus may include a computing application.

The system may include a secure backend server. The secure backend server may include a list of user identifiers, token serial numbers, device registration numbers and computing device identifiers.

During a pre-registration process, a mobile token may be planted and activated on a mobile device. As such, the mobile device may receive permission to activate the mobile token. The mobile device may receive a communication from the secure backend server. The communication may include the mobile token (or a hyperlink that enables download of the mobile token) and an activation code.

The mobile device may validate the activation code by communicating with the secure backend server. The mobile device may receive selection of a PIN. The mobile device may validate the PIN with the secure backend server. Upon completion of the activation code validation and PIN validation, the mobile token may be activated on the mobile device. The secure backend server may store a user identifier that identifiers a user of the mobile device, a token serial number that identifies the mobile token and a device registration number that identifies the mobile device.

During a registration process, the mobile device may be tied to the computing apparatus in order that the mobile device can be used to authenticate an application on the computing apparatus. The computing apparatus may receive an authentication request. The computing apparatus may request user entry of answers to challenge questions and/or user entry of a password. The computing apparatus may enable selection of a selectable item, such as a button. The button may be a software button. The computing apparatus may, upon selection of the selectable item, transmit a "push" notification to the mobile token on the mobile device. A "push" notification may be an automated message sent by an application to a user when the application is not open. The "push" notification may be transmitted to the mobile token on the mobile device. The mobile token may display the "push" notification on a screen of the mobile device.

Upon receipt of the "push" notification, the mobile token may initiate a request for entry of a PIN and/or biometric on the mobile device. Upon receipt of the PIN and/or biometric on the mobile device, the mobile device may link to the computing apparatus. The secure backend server may store a computing apparatus identification number that identifies the computing device in the list.

The secure backend server may store a data link between the stored token serial number, the stored computing apparatus identification number, the device registration number and the stored user identifier.

During an in-use process, the mobile device may be used to authenticate a user in order to sign-in to the application executing on the computing apparatus. The computing apparatus may receive entry of a user identifier. The computing device may receive selection of a biometric sign-in together with the entry of the user identifier. The computing apparatus may transmit a request to the secure backend server. The request may include the user identifier.

The secure backend server may identify the mobile device based on the device registration number associated with the user identifier. The secure backend server may transmit a "push" notification to the mobile token on the mobile device. The mobile token may request entry of the PIN and/or biometric. Upon receipt of the PIN and/or biometric at the mobile device, the mobile token may transmit an authenticated communication to the computing apparatus. The mobile device may display a successful sign-in confirmation upon transmission of the authenticated communication to the computing apparatus. The computing apparatus may authenticate the computer application.

In some embodiments, the secure backend server may transmit a notification to the computing apparatus. The notification may include a message to check the mobile device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative diagram. The illustrative diagram may show the communications between a mobile device and a secure backend system during a pre-registration process. The pre-registration process may be part of the first stage of authentication. In some embodiments, the pre-registration process may be part of the second stage of authentication. The pre-registration process may include mobile token installation on a mobile device.

Mobile device 102 may communicate with secure backend system 106. Mobile device 102 may request administrator permission to receive and install a mobile token from secure backed system 106. Step 1 shows secure backend system 106 may transmit, in response to the request for permission, administrator permission to mobile device 102 to activate a mobile token, as shown at 108.

It should be appreciated that, in some embodiments, mobile token 104 may be transmitted to mobile device 102 prior to receiving the administrator permission. However, mobile token 104 may not be activated until steps 1-5, shown at 108-116, have been performed. In certain embodiments, mobile token 104 may be transmitted to mobile device 102 with the administrator permission. In other embodiments, mobile token 104 may be included in the email with instructions shown at 110. In yet other embodiments, a hyperlink may be included in the email with instructions, shown at 110. The hyperlink, when selected may open a browser and direct the browser to a web page that downloads mobile token 104 to mobile device 102.

Step 2 shows that secure backend system 106 may transmit an email with instructions and an activation code to mobile device 102, as shown at 110.

Step 3 shows that mobile device 102 may communicate with secure backend system 106 to validate the received activation code, as shown at 112.

Step 4 shows that mobile device 102 may create and validate a personal identification number ("PIN") with secure backend system 114. In some embodiments, a biometric identifier, such as a fingerprint, iris scan or face scan may be used instead of, or together with, a PIN. It should be appreciated that, in some embodiments, the biometric may be retrieved by, verified and stored on mobile device 102 itself. As such, mobile device 102 may verify the biometric identifier when the biometric identifier is used to authenticate the user to the mobile token. In other embodiments, secure backend system 106 may store a copy of the biometric. As such, secure backend system 106 may verify the biometric identifier when the biometric identifier is used, at a later time from when the biometric identifier was stored, to authenticate the user to the mobile token.

Once the PIN and/or the biometric identifier is created and validated, mobile token 104 may be activated on mobile device 102. Step 5 shows that the token is activated on the mobile device, as shown at 116.

In order to maintain records of which users are associated with which mobile devices, and in order to maintain records of which mobile tokens are resident on which mobile devices, secure backend system 106 may maintain a list. The list may include user identifiers, associated token serial numbers and device registration numbers. In some embodiments, each user identifier may only be associated with one mobile token. As such, once a user identifier is associated with a mobile token, the secure backend system may prevent additional mobile tokens from being activated for an already-committed user identifier.

In certain embodiments, the token installation process may be performed as part of the authentication for the first mobile application. The token may, in some embodiments, be thereafter used as part of the process to authenticate for the second mobile application as well.

Figure 2:
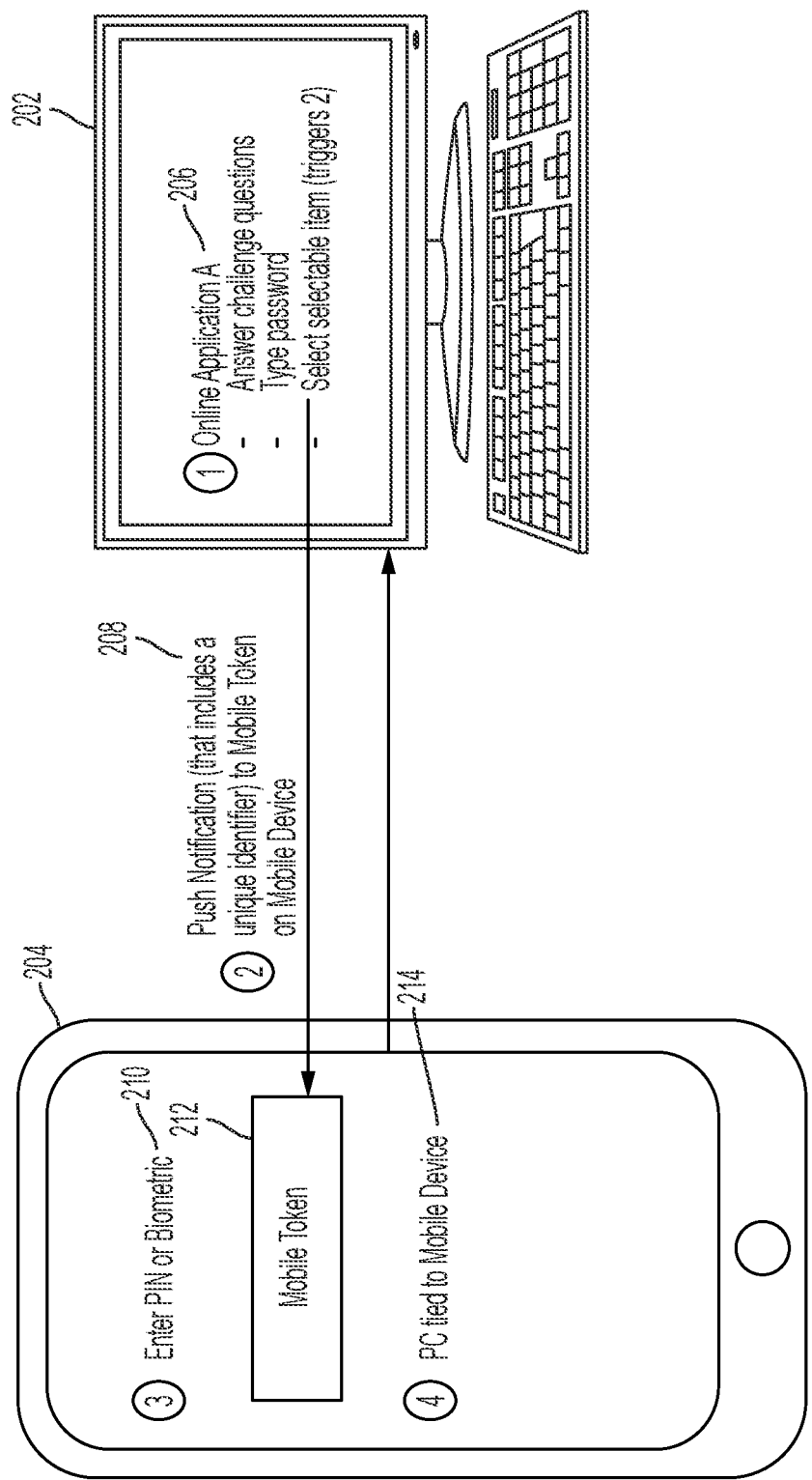
FIG. 2 shows another illustrative diagram in accordance with principles of the disclosure.

FIG. 2 shows another illustrative diagram. The illustrative diagram shows a registration process for installing a mobile device-based authenticator on a single personal computer ("PC") and a single mobile device.

Once a mobile token has been successfully installed on a mobile device, the mobile token may be used to register the hosting mobile device. The token-based registration may be used to perform mobile device-based authentication on a computing apparatus, such as a PC. The token-based registration may also be used as part of an authentication process for a second digital application.

In order to register a computing apparatus by tying the computing device to a mobile device, a registration process may be executed. The registration process may include step 1, shown at 206. At step 1, online application A may be logged into and open on computing apparatus 202. Online application A may receive a request to register mobile device-based authenticator registration on a single PC and a single mobile device. A PC user may be requested to answer challenge questions and type a password. Upon entry of correct answers to challenge questions and upon entry of a password, the user may be enabled to select a selectable item.

Selection of the selection item may trigger step 2. At step 2, a "push" notification may be pushed to mobile token 212. Mobile token 212 may be resident on mobile device 204. The "push" notification may include a unique identifier.

At step 3, a user may be prompted to enter a PIN and/or biometric on mobile device 204, shown at 210. As shown at step 4, upon entry of the PIN and/or biometric, the PC may be tied to the mobile device, as shown at 214. The successful registration process may be displayed on mobile device 204 and/or computing apparatus 202.

Figure 3:
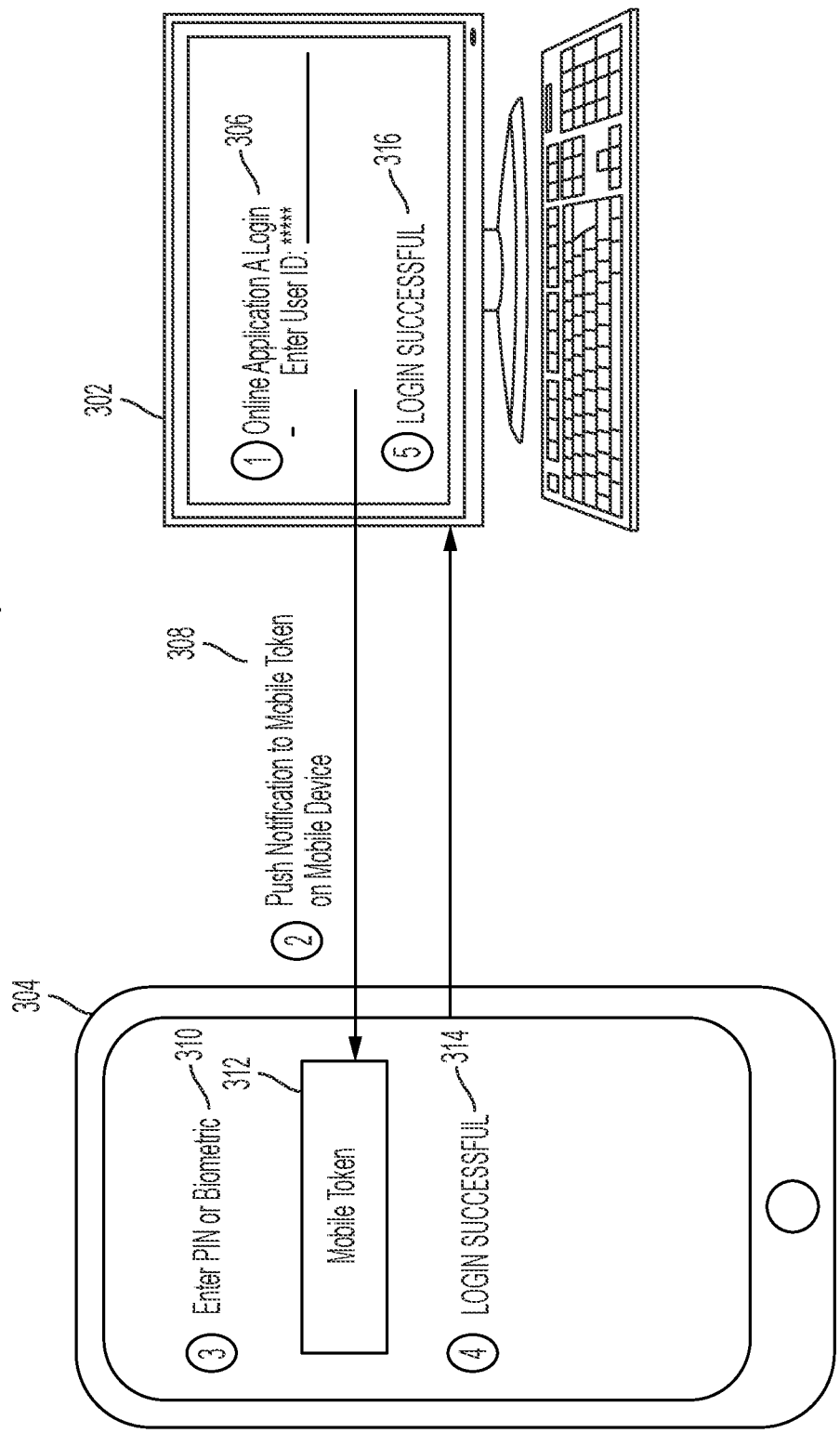
FIG. 3 shows yet another illustrative diagram in accordance with principles of the disclosure.

FIG. 3 shows another illustrative diagram. The illustrative diagram shows an in-use process for authenticating access to a PC using a mobile device.

Step 1, shown at 306, includes the entry of a user identifier in to a computing application executing on computing device 302. Step 2, shown at 308, includes the transmission of a "push" notification to mobile token 312. Mobile token 312 may reside on mobile device 304. Step 3, shown at 310, includes user entry of a PIN or biometric at mobile device 304. Step 4, shown at 314, includes a "login successful" message displayed on mobile device 304. Step 5, shown at 316, includes a "login successful" message displayed on computing device 302.

Figure 4:
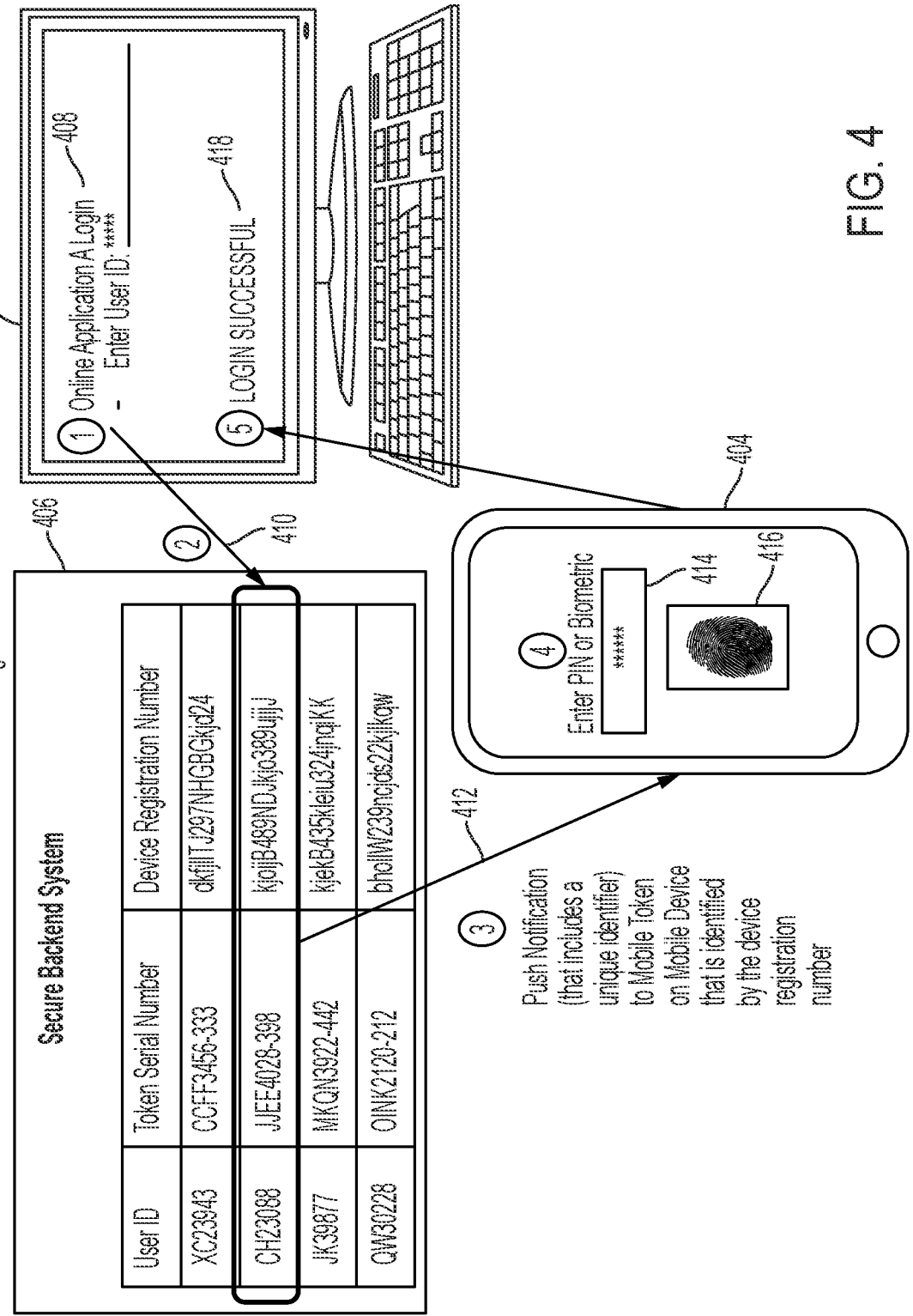
FIG. 4 shows still another illustrative diagram in accordance with principles of the disclosure.

FIG. 4 shows an illustrative diagram. The illustrative diagram shows further detail of the in-use process for authenticating access to a PC using a mobile device.

Step 1, shown at 408, includes the entry of a user identifier in to a computing application executing on computing device 402. Upon entry of the user identifier, the computing application may communicate with secure backend system 406. The communication may include the user identifier, or an encrypted form of the user identifier.

Secure backend system 406 may receive the user identifier, or the encrypted form of the user identifier, as shown at 410. In the event that the user identifier is encrypted, secure backend system 406 may decrypt the user identifier. Secure backend system 406 may search a database, located at secure backend system 406, to identify a mobile token serial number and a device registration number associated with the user identifier. Upon identification of the token serial number and device registration number, secure backend system 406 transmits a "push" notification to a mobile device, identified by the device registration number. Step 3, shown at 412, shows secure backend system 406 transmitting the "push" notification to mobile device 404.

It should be appreciated that, because the system may be a one-computing apparatus to a one-mobile device architecture, there may preferably be one user identifier for each device registration number. Also, in some embodiments, the database may also include a computing device registration number. As such, in order to utilize the mobile device authentication process, a user may be located at one predetermined computer, with access to one mobile device, in order to effectively access the computing application.

Step 4, shown on mobile device 404, includes a request for entry of a PIN and/or biometric. A PIN may be entered into entry box 414. A biometric, such as a fingerprint, face scan and iris scan may be entered in to entry box 416 on mobile device 404. Upon entry of a correct PIN and/or biometric, mobile device 404 may transmit a login successful message to computing device 402. Upon receipt of the login successful message at computing device 402, computing device 402 displays a login successful message, as shown at 418.

Figure 5:
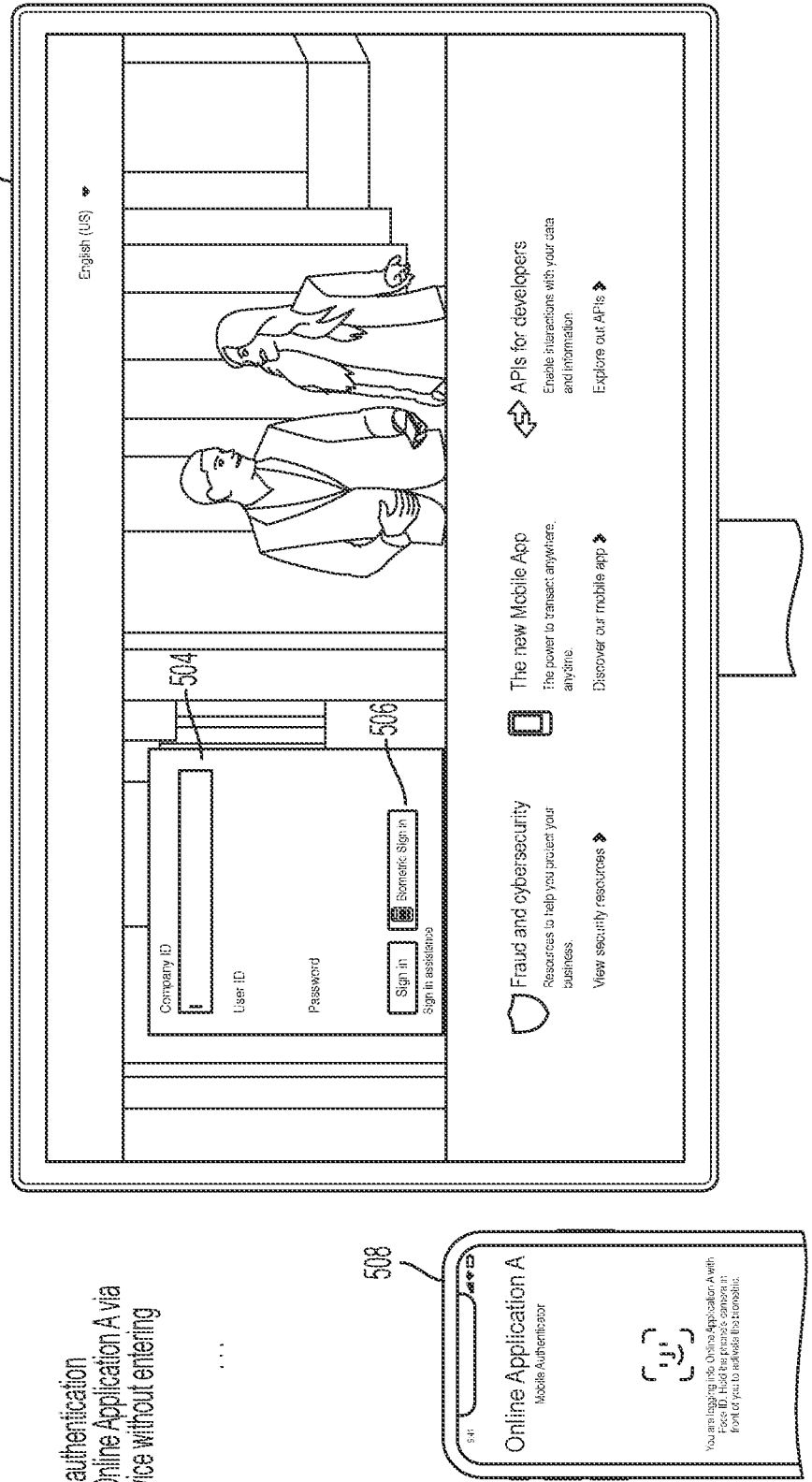
FIG. 5 shows yet another illustrative diagram in accordance with principles of the disclosure.

FIG. 5 shows an illustrative diagram. The illustrative diagram shows authenticating an identity via biometrics when signing in to online application A. The illustrative diagram shows that the authentication may be automatic. As such, a user may sign in to online application A via a mobile device without entering a password.

The illustrative diagram includes computing device 502 and mobile device 508. Computing device 502 may include a computing application. The computing application may include sign-in entry box 504. As shown, a user may enter a company identifier, a user identifier and a password and select sign-in. However, a user may also enter a user identifier (in some embodiments, and a company identifier) and select biometric sign-in selectable button 506.

Upon selection of biometric sign-in selectable button 506, mobile device 508 may request a biometric identifier. Mobile device 508 may request, for example, a face identifier in order to sign in to the computing application displayed on computing device 502.

Figure 6:
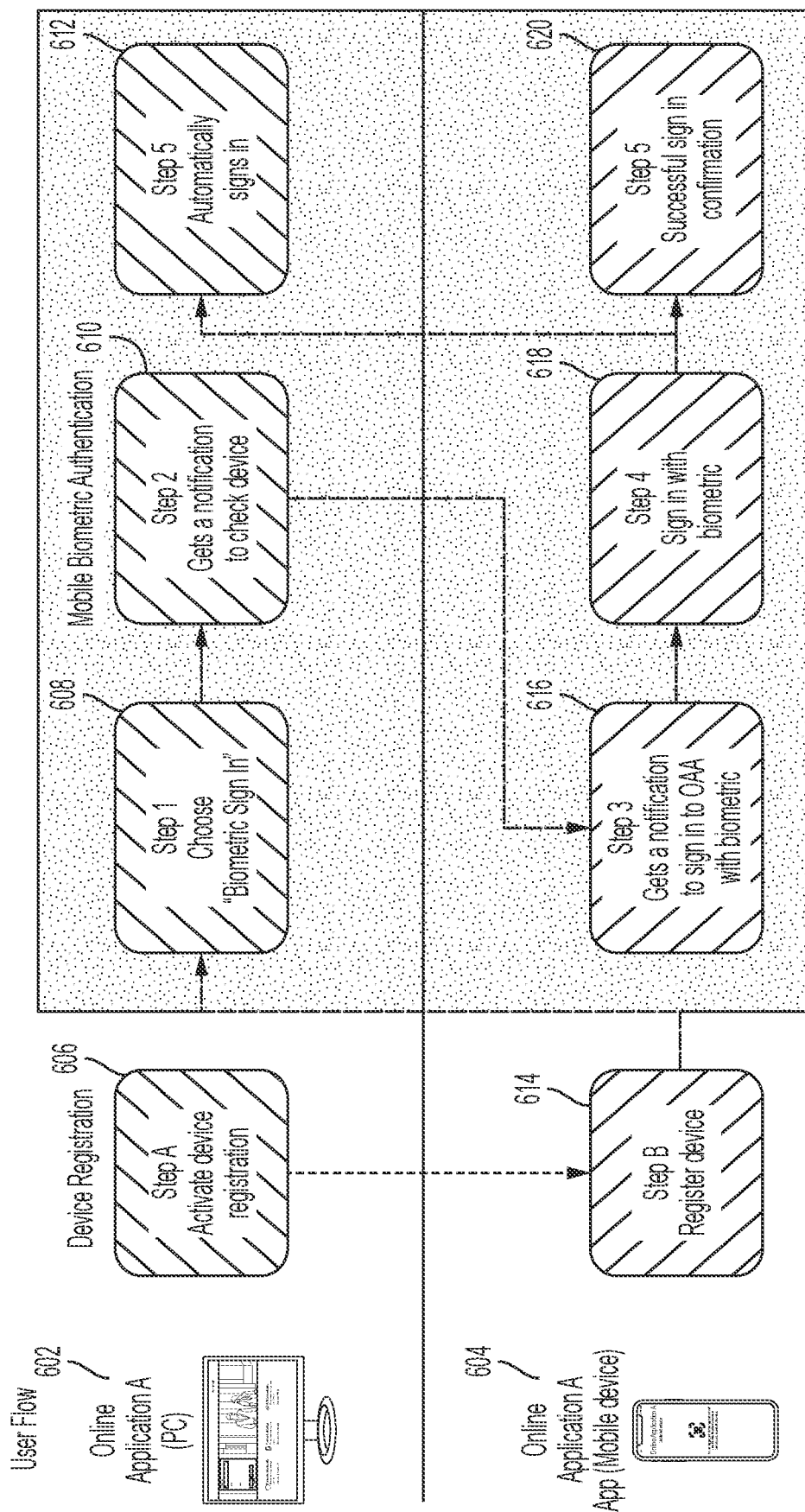
FIG. 6 shows an illustrative flow chart in accordance with principles of the disclosure.

FIG. 6 shows an illustrative flow diagram. The illustrative flow diagram shows the registration and authentication processes as they appear to a user. A user may be associated with online application A (PC), as shown at 602. The user may also be associated with online application A App (mobile device), as shown at 604.

Device registration may include step A and step B, shown at 606 and 614. Step A, shown at 606, may include activating device registration on the PC. Step B, shown at 614, may include registering the mobile device using an authentication platform on the mobile device.

Mobile Biometric Authentication may include steps 1-5, shown at 608-620. Step 1, shows at 608, includes choosing biometric sign-in at the PC. Step 2, shown at 610, includes getting a notification on the PC. The notification may instruct the user to check or otherwise evaluate the mobile device.

Step 3, shown at 616, includes getting a notification, on the mobile device. The notification may instruct a user to enter a biometric identifier on the mobile device in order to sign in to the application executing on the PC. Step 4, shown at 618, may include a user entering a biometric identifier on the mobile device.

Step 5 may be shown at both 612 and 620. Step 5 may show a successful sign-in. As shown at 612, step 5 may include automatically signing in to the computing application on the PC. As shown at 620, step 5 may include presenting a display of a successful sign-in confirmation.

Figure 7:
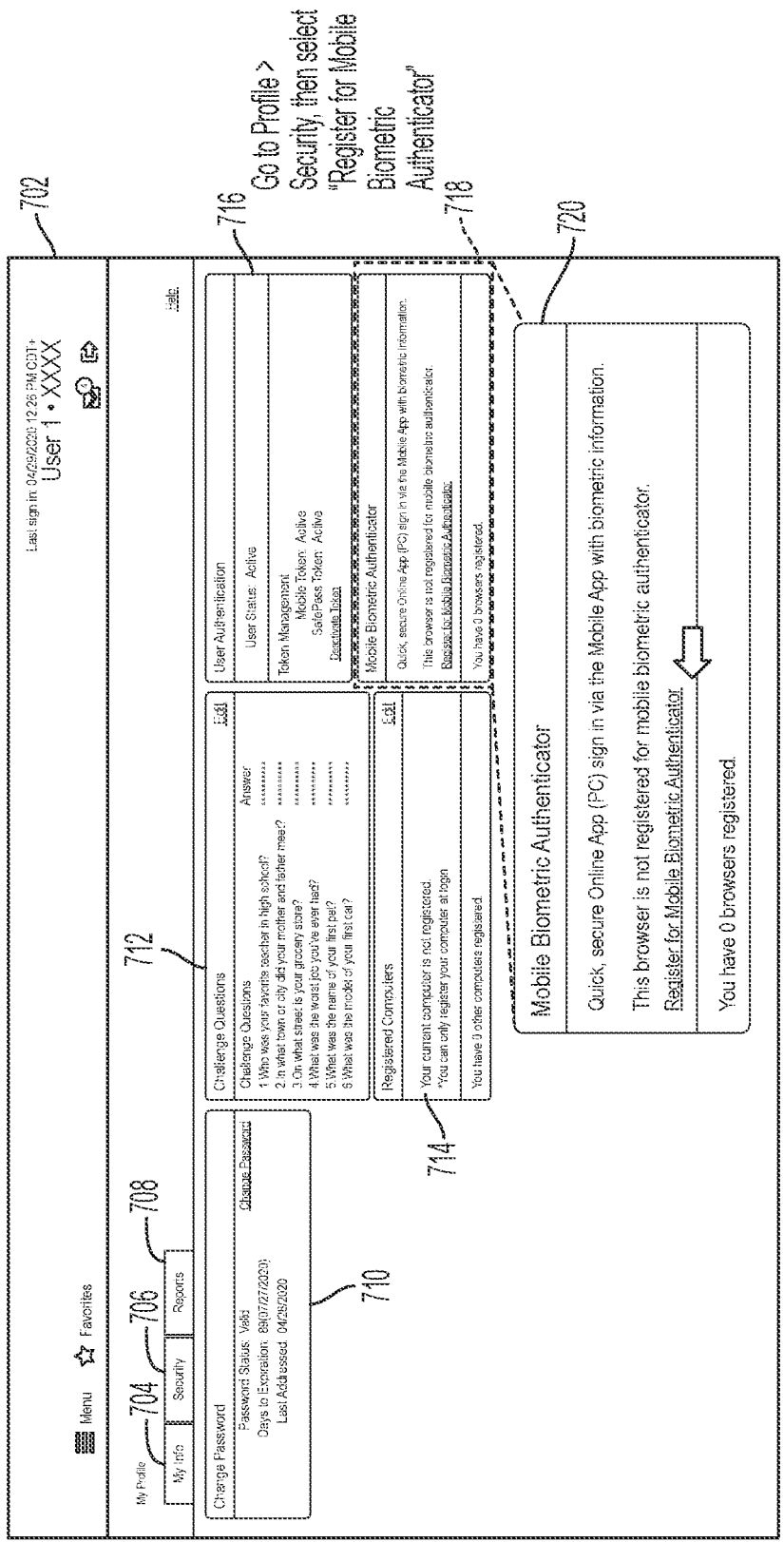
FIG. 7 shows an illustrative screenshot in accordance with principles of the disclosure.

FIG. 7 shows an illustrative screenshot. The illustrative screenshot may further illustrate step A that was shown in FIG. 6. Step A may include activation of device registration on the online application of the computing device. Webpage 702 may be a page included in an online portal. The online portal may include the following tabs: my info (704), security (706) and reports (708). Webpage 702 may be open to security tab 706.

Security tab 706 may include a change password section, shown at 710. Change password section 710 may enable a user to change a password.

Security tab 706 may include a challenge questions section, shown at 712. Challenge questions section 712 may enable a user to enter, review, respond to and/or edit challenge questions.

Security tab 706 may include a user authentication section, shown at 716. User authentication section 716 may display authentication status and token management data. User authentication section 716 may also enable deactivation of the token.

Security tab 706 may also include a registered computers section, shown at 714. Registered computers section 714 may display data regarding registered computers.

Security tab 706 may also include mobile biometric authenticator section 718. Mobile biometric authenticator section 718 may be shown enlarged at 720. Mobile biometric authenticator section 720 may enable a user to register for mobile biometric authentication and/or display data relating to browsers that registered for biometric authentication. Mobile biometric authentication section 720 may show that a mobile device is not currently registered.

Figure 8:
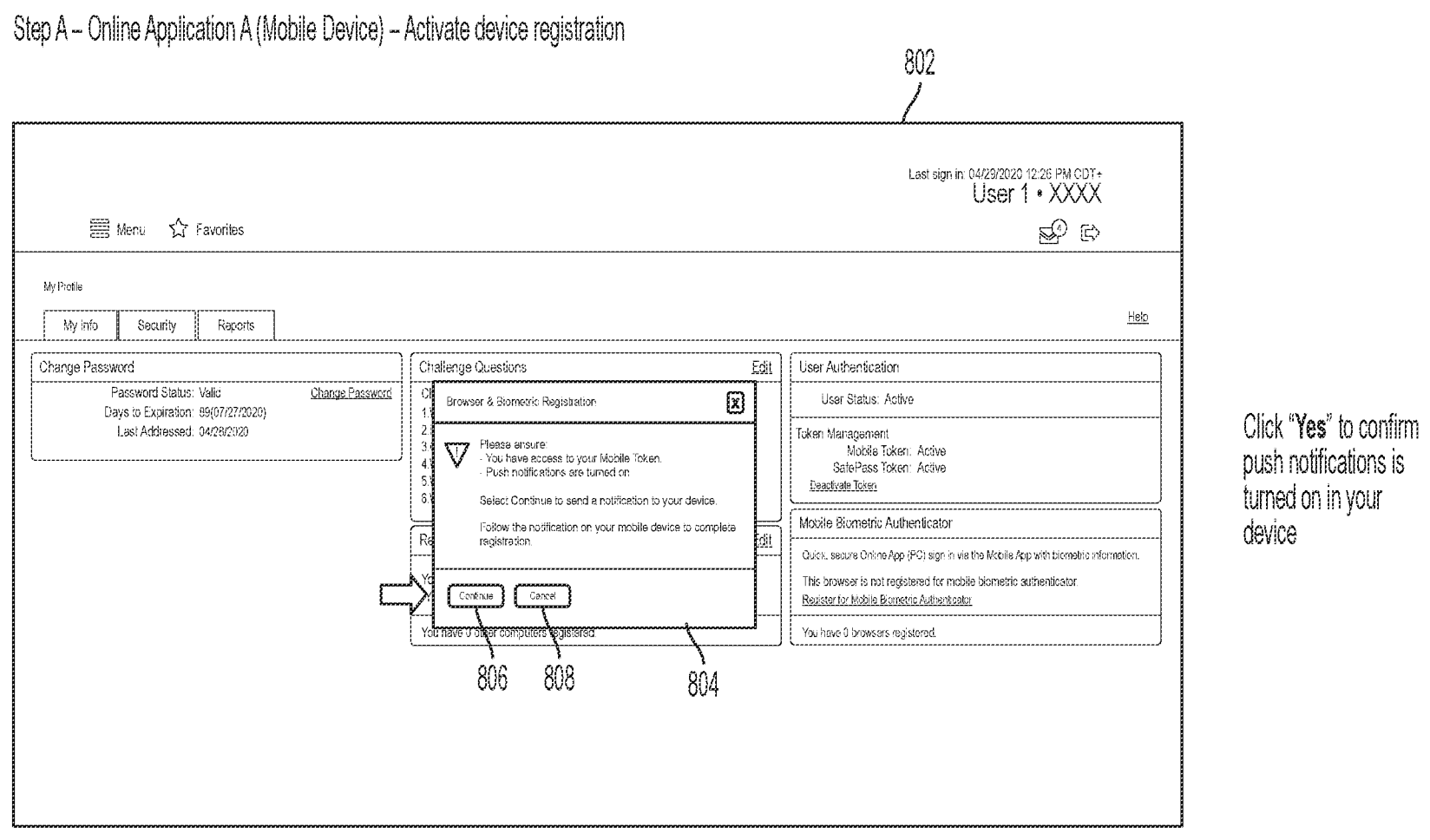

FIG. 8 shows an illustrative screenshot. The illustrative screenshot may be displayed, upon selection, a selectable button within mobile biometric authenticator, shown in FIG. 7. Screen 802 may include box 804. Box 804 may instruct that, in order to register for mobile biometric authentication, the user may require access to the mobile token and "push" notifications on the mobile device may be turned on. Box 804 may include continue button 806 and cancel button 808.

Figure 9:
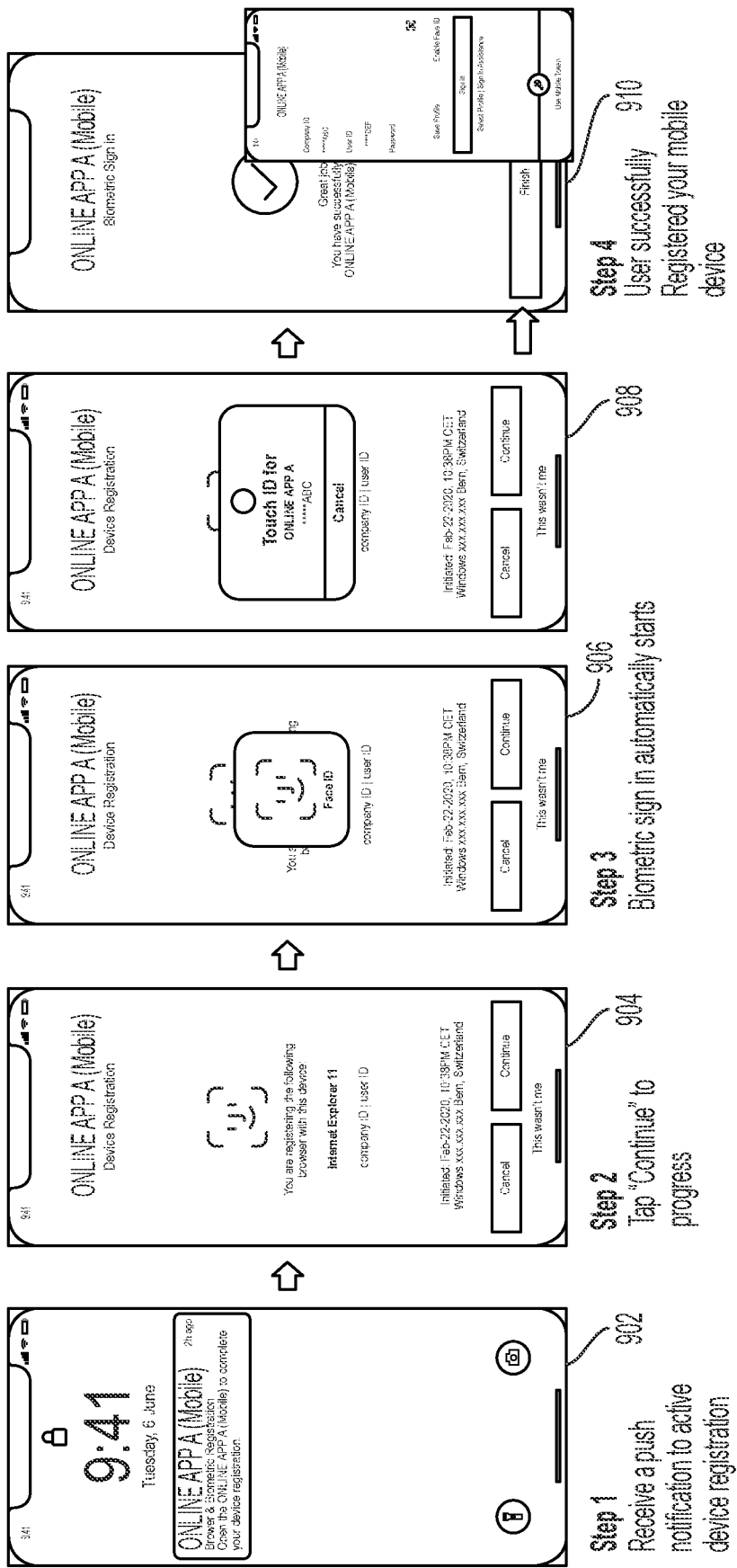
FIG. 9 shows an illustrative diagram in accordance with principles of the disclosure.

FIG. 9 shows illustrative screenshots. The illustrative screenshots may be displayed on a mobile device during step B (as shown in FIG. 6). Step B may include registering the mobile device in order that the mobile device can be used to authenticate the computing apparatus.

The mobile device registration process may be initiated with a push notification being received at the mobile device, as shown at 902. A user may be instructed to open a computing application on the mobile device to complete the mobile device registration.

The user may open the computing application, as shown at 904. The user may select the continue button in order to proceed to the next screen. The next screen may request a biometric identifier from the user. The biometric identifier may be a face scan, as shown at 906. The biometric identifier may be a touch identifier, or fingerprint scan, as shown at 908.

A user may select finish to complete the registration process, as shown at 910. As such, upon selection of the finish button, the mobile device may be registered.

Figure 10:
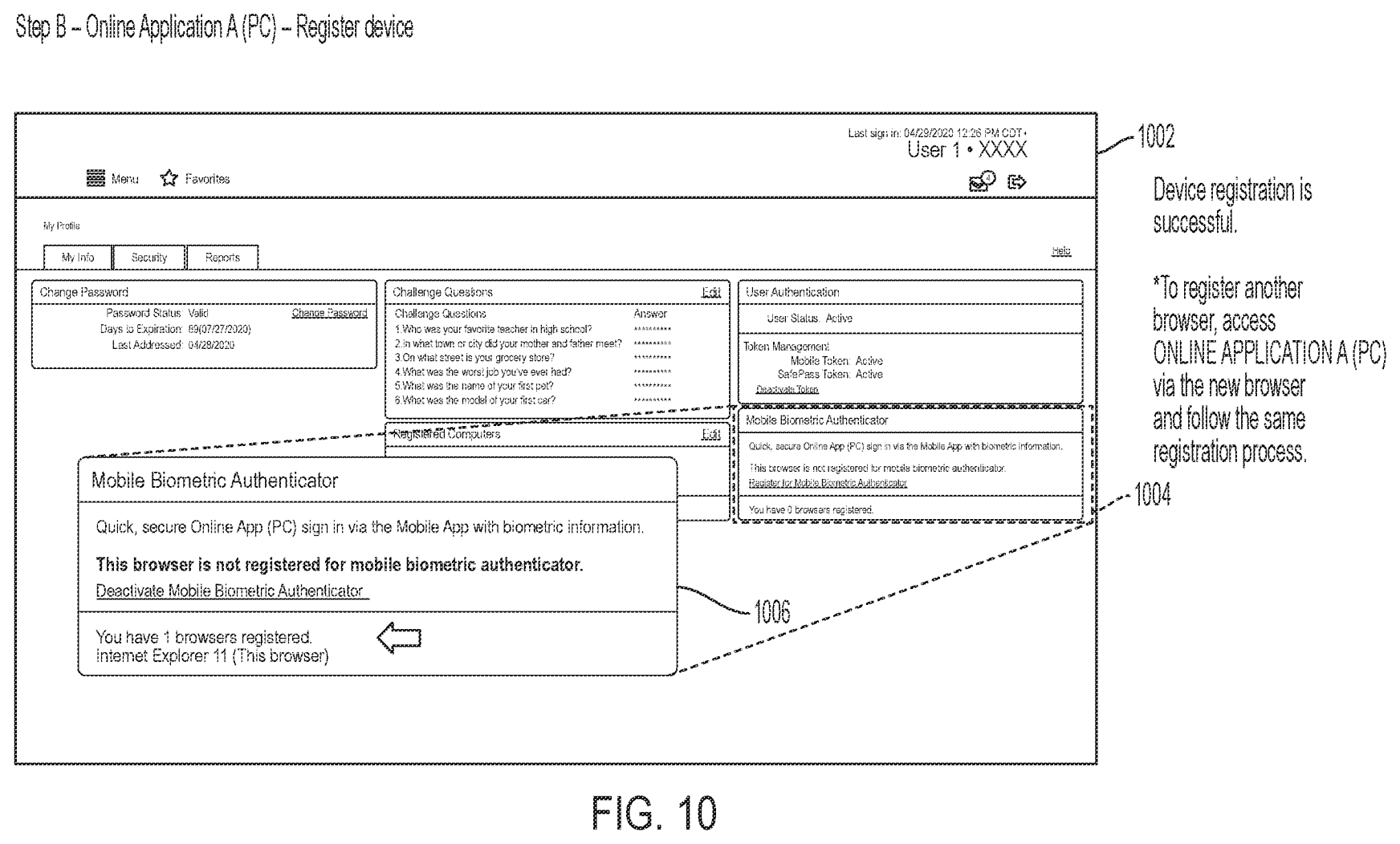

FIG. 10 shows an illustrative screenshot. The illustrative screenshot displays webpage 1002. Webpage 1002 may be similar to webpage 702 (shown in FIG. 7). However, webpage 1002 may be displayed after the registration of a mobile device. In webpage 1002, mobile biometric authenticator section shown at 1004 and enlarged at 1006 may include a registered mobile device.

Figure 11:
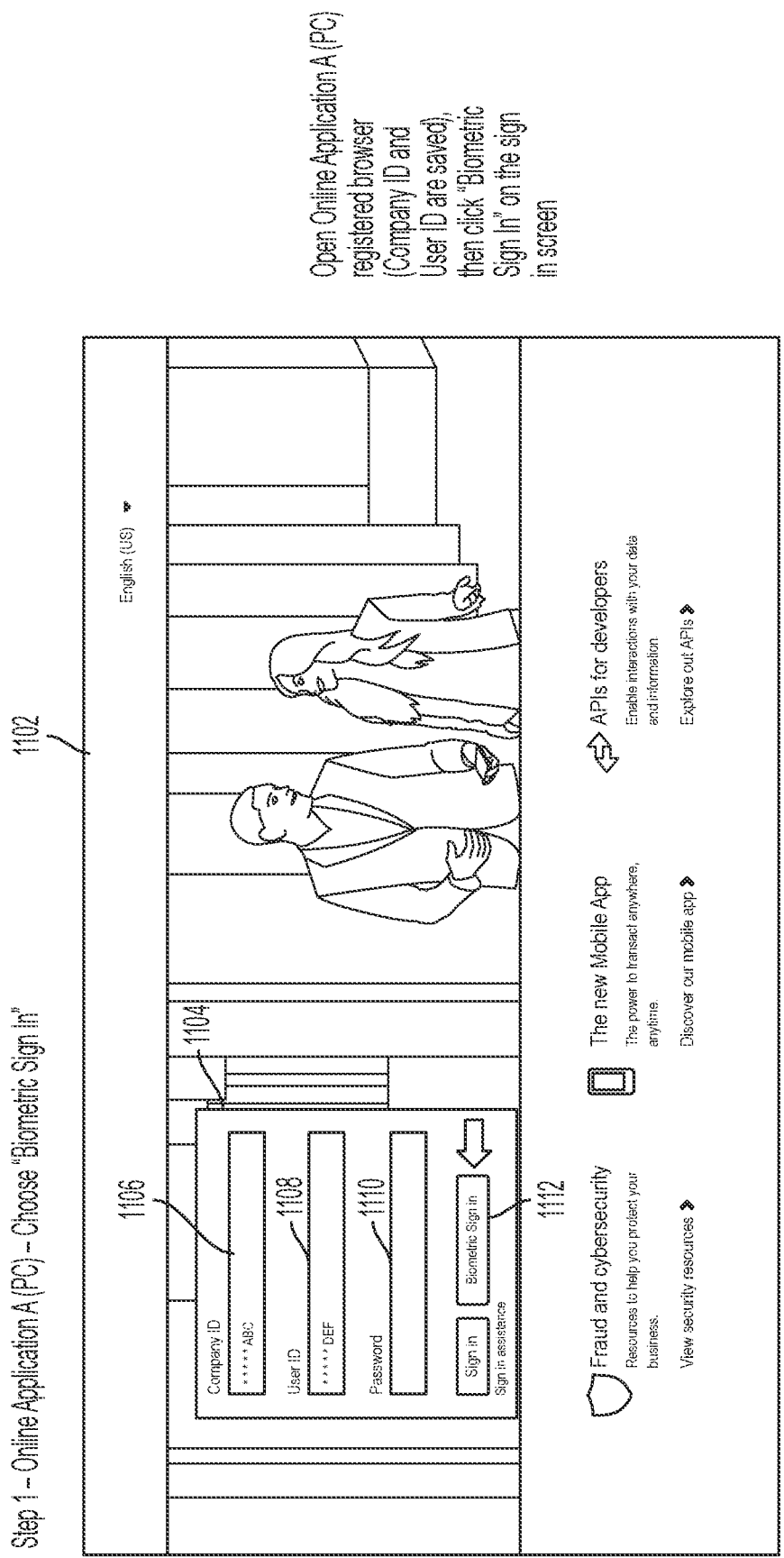
FIG. 11 shows another illustrative screenshot in accordance with principles of the disclosure.

FIG. 11 shows an illustrative screenshot. The illustrative screenshot illustrates step 1 (shown in FIG. 6). Webpage 1102 may include entry box 1104. Entry box 1104 may include company identifier entry field 1106, user identifier entry field 1108 and password entry field 1110. Entry box 1104 may also include biometric sign-in button 1112. Biometric sign-in button 1112 may be activated upon entry of a user identifier. In some embodiments, biometric sign-in button 1112 may be activated upon entry of a user identifier and a company identifier.

Figure 12:
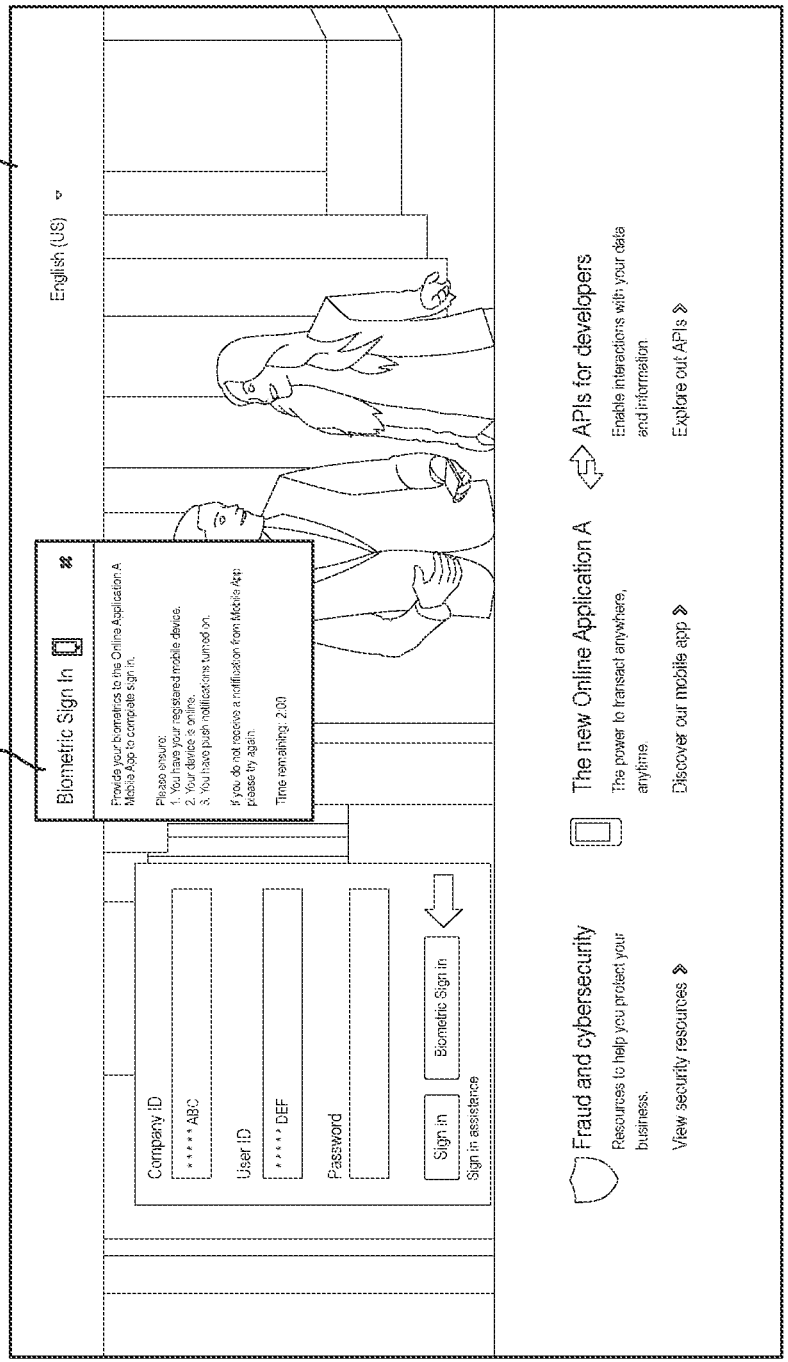
FIG. 12 shows another illustrative screenshot in accordance with principles of the disclosure.

FIG. 12 shows an illustrative screenshot. The illustrative screenshot may display a webpage that may be presented upon selection of biometric sign-in button 1112 (shown in FIG. 11). Instruction box 1204 instructs a user to provide a biometric identifier to the linked mobile device in order to be authenticated into the online application. Instruction box 1204 may also include a timer. The timer may instruct an amount of time remaining to enter the biometric identifier. The time limit may provide an additional level of security.

Figure 13:
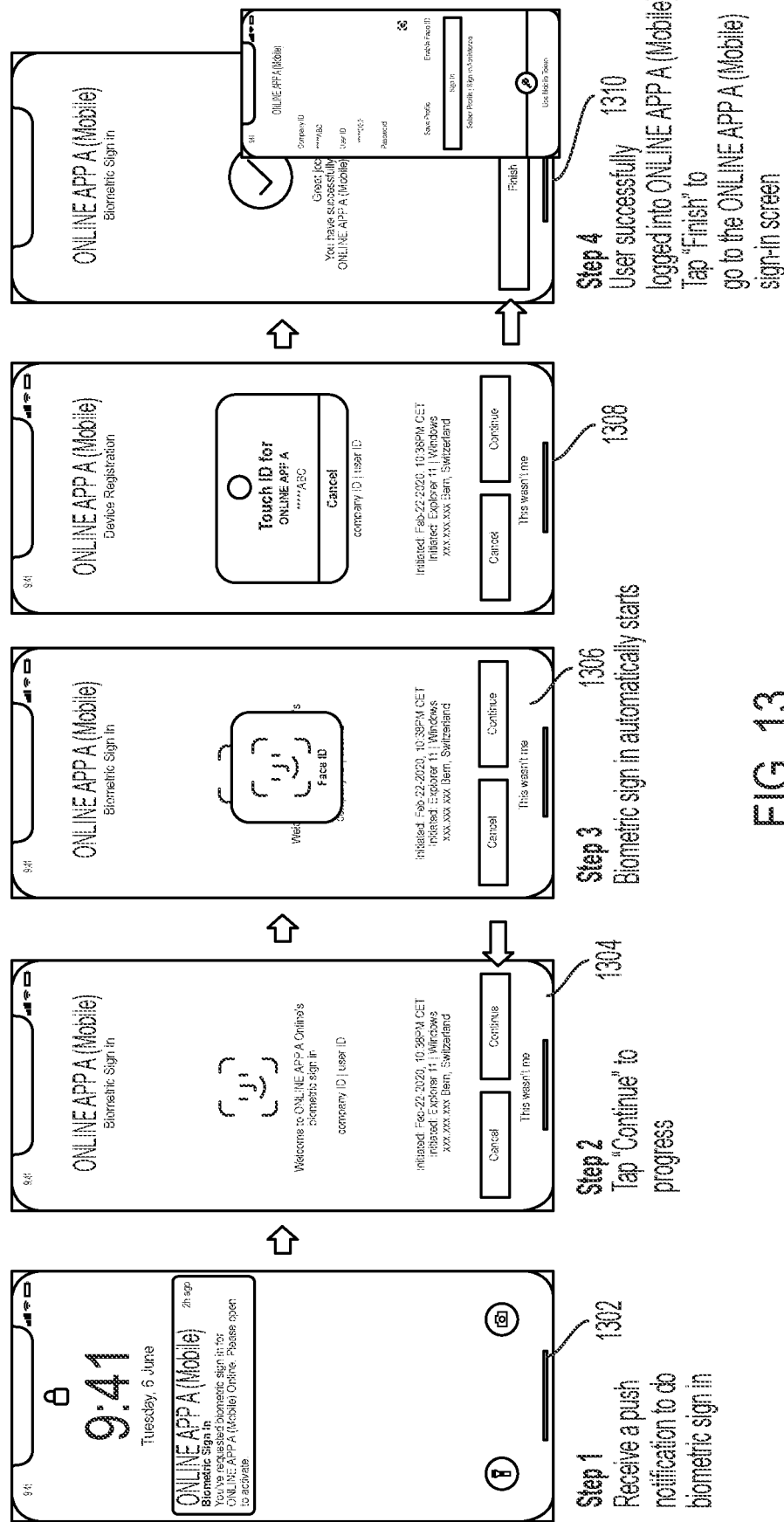
FIG. 13 shows illustrative screenshots in accordance with principles of the disclosure.

FIG. 13 shows illustrative screenshots. The illustrative screenshots may include steps 3-5 of the mobile device (as shown in FIG. 6). Steps 3-5 may show sign-in with biometric identifier on a mobile device. The mobile device may receive a push notification to perform a biometric sign-in, as shown at 1302. A user may be instructed to open a computing application on the mobile device in order to perform the biometric sign-in. Within the computing application, a user may select continue to progress to the next screen, as shown 1304. A user may be requested to enter a biometric identifier, as shown at 1306 and 1308. Once the biometric identifier is received at the mobile device, a "login successful" message may be displayed on the mobile device, as shown at 1310.

Figure 14:
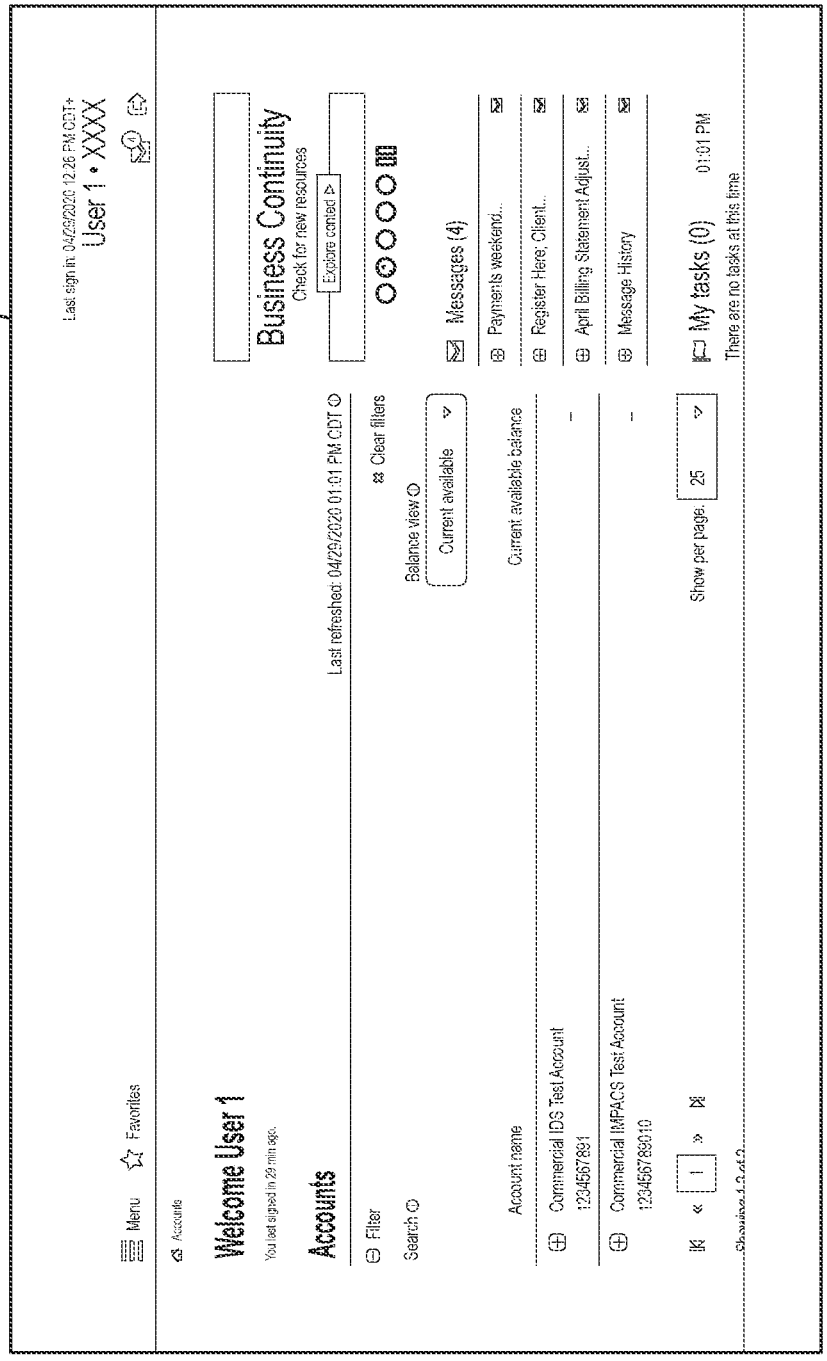
FIG. 14 shows an illustrative screenshot in accordance with principles of the disclosure.

FIG. 14 shows an illustrative screenshot. The illustrative screenshot may include step 5 of the computing device (as shown in FIG. 6). Webpage 1402 shows that, once a user has provided a correct biometric identifier to the mobile device, the computing application on the computer may be automatically opened.

Figure 15:
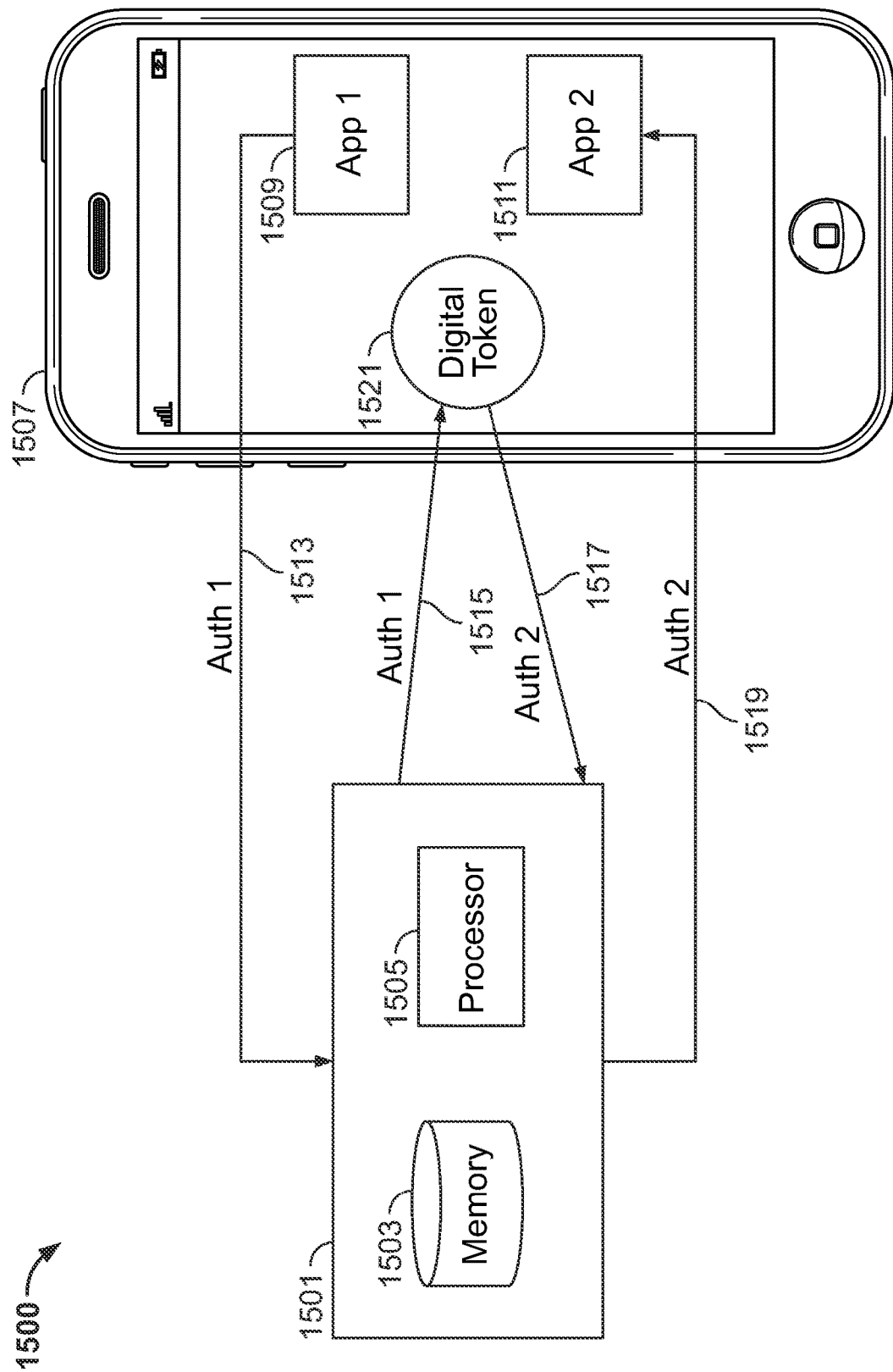
FIG. 15 shows an illustrative diagram in accordance with principles of the disclosure.

FIG. 15 shows illustrative diagram 1500 in accordance with principles of the disclosure. Diagram 1500 shows an example of a system architecture for multi-stage, identity-based, digital authentication.

Diagram 1500 shows central server 1501. Central server 1501 includes memory 1503 and processor 1505. Diagram 1500 also shows computing device 1507. Computing device 1507 may be a mobile device, such as a smartphone or tablet. Computing device 1507 may include first digital application 1509 and second digital application 1511.

A user profile may request access to first digital application 1509. Computing device 1507 may execute first authentication process 1513, which may be executed in conjunction with a database stored at central server 1501. First authentication process 1513 may include tokenization process 1515, which may include generating and storing digital token 1521 at computing device 1507.

The user profile may thereafter request access to second digital application 1511. Computing device 1507 may execute second authentication process 1519. Second authentication process 1517 may leverage information stored at central server 1501. Second authentication process 1517 may include tokenization process 1517 which may utilize digital token 1521. Second authentication process 1517 may be run by first digital application 1509 in conjunction with central server 1501. Second authentication process 1517 may provide authenticated access to second digital application 1511 without the user profile needing to take any additional steps, or, in some embodiments, with only minimal steps such as selecting a link that was generated and transmitted by first digital application 1509 to computing device 1507 via, for example, email or a push notification.

Figure 16:
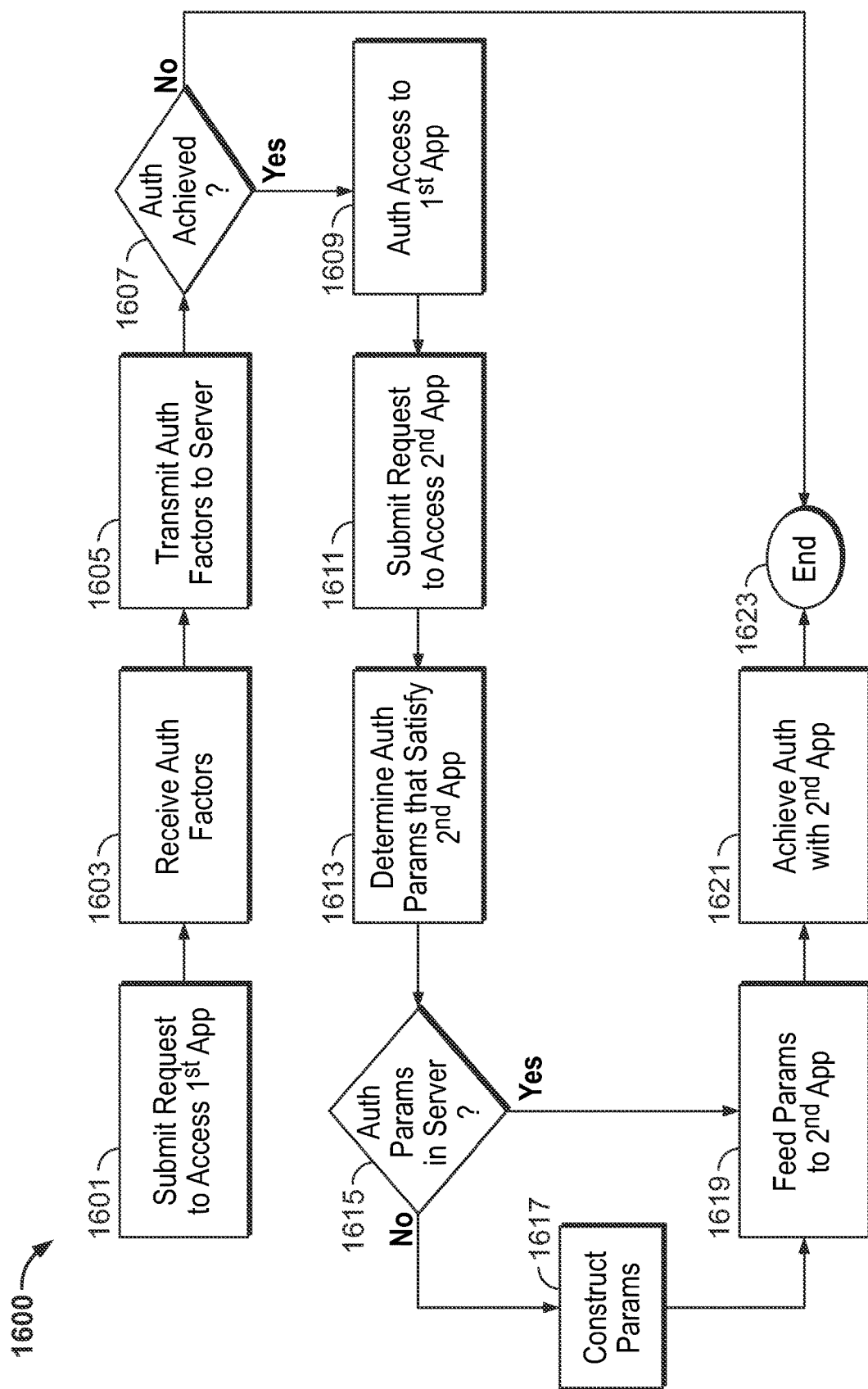
FIG. 16 shows an illustrative flowchart in accordance with principles of the disclosure.

FIG. 16 shows illustrative flowchart 1600 in accordance with principles of the disclosure. At step 1601, a user submits a request to access a first digital application, such as a mobile app installed on a mobile computing device. At step 1603, the system receives authentication factors from the user. At step 1605, the system transmits the authentication factors to a central server. At step 1607 the system queries if authentication is achieved. If authentication is not achieved, the process ends with step 1623. If authentication is achieved, the user is provided authenticated access to the first mobile app at 1609.

At step 1611 the user submits a request to access a second digital app. At step 1613 the system determines authentication parameters needed to authenticate the user to the second app. At step 1615 the system queries if the necessary authentication parameters are already in the server and/or on the computing device. If the necessary authentication parameters are not already obtained, and there is a gap that needs to be filled, the system (e.g., as directed by the first app) may, at 1617, determine what information is lacking to satisfy the authentication parameters, and the system may construct the missing parameters. Constructing the missing parameters may include sending a targeted request for the missing information, utilizing biometric data, utilizing a digital token, and/or generating and sending a link with a one-time password (OTP) via email or a push notification.

When the authentication parameters are obtained, the system may, at step 1619, feed the authentication parameters to the second app. Feeding the authentication parameters to the second app may include communicating directly with the second app through an application programming interface (API). At step 1621, the system may achieve authentication for the user to the second app. The process may end at step 1623.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for multi-stage, identity-based, digital authentication are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for multi-stage, identity-based, digital authentication, the system comprising:
   a computing device comprising a first digital application and a second digital application, wherein said first and second digital applications utilize separate authentications; and
   a secure central server;
   wherein:
      during a first stage of the authentication:
         a user profile submits a first request, on the computing device, to access the first digital application;
         the computing device receives, as input, one or more authenticating factors;
         the computing device transmits, to the central server, the one or more authenticating factors;
         the central server processes the one or more authenticating factors, said processing comprising comparing the one or more authenticating factors to a database of user profile data to achieve authentication of the user profile's identity when a threshold match is achieved between the one or more authenticating factors and a profile in the database; and in response to achieving authentication, the central server communicates to the computing device that the user profile is authenticated to access the first digital application; and during a second stage of the authentication:
the user profile submits a second request, on the computing device, to access the second digital application;
in response to the second request, the first digital application:
determines authentication parameters needed to satisfy authentication for the second digital application;
determines a gap between the authentication parameters needed to satisfy authentication for the second digital application and information about the user profile stored in the database at the central server; and
generates and transmits an actionable request to the user profile for information that fills the gap; and
based on information about the user profile stored in the database at the central server combined with a response received for the actionable request, the first digital application communicates to the second digital application the authentication parameters to achieve authentication of the user profile for the second digital application.

2. The system of claim 1 wherein, in response to achieving authentication for the first digital application, the central server generates a digital authentication token that is stored at the computing device and facilitates access to the first digital application.

3. The system of claim 2 wherein the digital token is also used to facilitate access to the second application.

4. The system of claim 1 wherein one of the authenticating parameters is a one-time password ("OTP"), wherein:
the OTP is:
generated at the central server for the user profile;
stored in the database in connection with the user profile; and
securely communicated to the user profile; and
authentication is achieved when the OTP that is inputted at the computing device matches the OTP that is stored in the database in connection with the user profile.

5. The system of claim 4 wherein:
the OTP is securely communicated to the user profile via a link in an email message; and
the OTP is inputted at the computing device automatically in response to selection of the link.

6. The system of claim 4 wherein:
the OTP is securely communicated to the user profile via a push notification to the computing device; and
the OTP is inputted at the computing device automatically in response to selection of the push notification.

7. The system of claim 1 wherein:
the actionable request is custom tailored by the first digital application based on the authentication parameters needed to satisfy authentication for the second digital application as determined at runtime; and
the first digital application communicates the authentication parameters to the second digital application directly via an application programming interface ("API") of the second digital application.

8. The system of claim 1 wherein one of the authenticating factors and/or the authenticating parameters comprises biometric data, wherein said biometric data is generated by the computing device via one or more sensors of the computing device.

9. The system of claim 1 wherein the first digital application is a mobile banking application.

10. The system of claim 9 wherein the second stage of the authentication is achieved even when second digital application is a payment platform or a virtual-reality environment.

11. A method for multi-stage, identity-based, digital authentication, the method comprising:
a first stage of authentication that comprises:
a user profile submitting a first request, on a computing device, to access a first digital application;
the computing device receiving, as input, one or more authenticating factors;
the computing device transmitting, to a central server, the one or more authenticating factors;
the central server processing the one or more authenticating factors, said processing comprising comparing the one or more authenticating factors to a database of user profile data to achieve authentication of the user profile's identity when a threshold match is achieved between the one or more authenticating factors and a profile in the database; and
in response to achieving authentication, the central server communicating to the computing device that the user profile is authenticated to access the first digital application; and
a second stage of authentication that comprises:
the user profile submitting a second request, on the computing device, to access the second digital application, wherein the first and second digital applications utilize separate authentications;
in response to the second request, the first digital application:
determining authentication parameters needed to satisfy authentication for the second digital application;
determining a gap between the authentication parameters needed to satisfy authentication for the second digital application and information about the user profile stored in the database at the central server; and
generating and transmitting an actionable request to the user profile for information that fills the gap; and
based on information about the user profile stored in the database at the central server combined with a response received for the actionable request, the first digital application communicating to the second digital application the authentication parameters to achieve authentication of the user profile for the second digital application.

12. The method of claim 11 further comprising, in response to achieving authentication for the first digital application, the central server generating a digital authentication token that is stored at the computing device and facilitates access to the first digital application.

13. The method of claim 12 further comprising using the digital token to also facilitate access to the second application.

14. The method of claim 11 wherein one of the authenticating parameters is a one-time password ("OTP"), and the method further comprises:
generating the OTP at the central server for the user profile;

storing the OTP in the database in connection with the user profile;
securely communicating the OTP to the user profile; and
achieving authentication when the OTP that is inputted at the computing device matches the OTP that is stored in the database in connection with the user profile.

15. The method of claim 14 further comprising:
securely communicating the OTP to the user profile via a link in an email message; and
inputting the OTP at the computing device automatically in response to selection of the link.

16. The method of claim 14 further comprising:
securely communicating the OTP to the user profile via a push notification to the computing device; and
inputting the OTP at the computing device automatically in response to selection of the push notification.

17. The method of claim 11 further comprising:
custom tailoring the actionable request by the first digital application based on the authentication parameters needed to satisfy authentication for the second digital application as determined at runtime; and the first digital application communicating the authentication parameters to the second digital application directly via an application programming interface ("API") of the second digital application.

18. The method of claim 11 wherein one of the authenticating factors comprises biometric data, wherein said biometric data is generated by the computing device via one or more sensors of the computing device.

19. The method of claim 11 wherein the first digital application is a mobile banking application.

20. The method of claim 19 wherein the second stage of the authentication is achieved even when second digital application is a payment platform or a virtual-reality environment.

* * * * *